(12) United States Patent
Tanabe et al.

(10) Patent No.: US 11,227,595 B2
(45) Date of Patent: Jan. 18, 2022

(54) ELECTRONIC DEVICE WITH SPEECH RECOGNITION FUNCTION, CONTROL METHOD OF ELECTRONIC DEVICE WITH SPEECH RECOGNITION FUNCTION, AND RECORDING MEDIUM

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

(*) Notice: Subject to any disclaimer, the term of this patent is extended or adjusted under 35 U.S.C. 154(b) by 261 days.

(21) Appl. No.: 16/551,342

(22) Filed: Aug. 26, 2019

(65) Prior Publication Data

US 2020/0066272 A1     Feb. 27, 2020

(30) Foreign Application Priority Data

Aug. 27, 2018 (JP) .............................. JP2018-158309

(51) Int. Cl.
*G10L 15/22* (2006.01)
*G06F 3/0484* (2013.01)
(Continued)

(52) U.S. Cl.
CPC ............ *G10L 15/22* (2013.01); *G06F 3/0484* (2013.01); *G06F 3/167* (2013.01); *H04R 3/00* (2013.01);
(Continued)

(58) Field of Classification Search
CPC .............. G10L 15/22; G10L 2015/223; G10L 2015/228; G06F 3/04883; G06F 3/0484;
(Continued)

(56) References Cited

U.S. PATENT DOCUMENTS

2016/0011768 A1   1/2016 Yim et al.
2016/0182710 A1*  6/2016 Flamini ................. H04M 9/082
                                                             455/567

(Continued)

FOREIGN PATENT DOCUMENTS

JP    2003-244314 A    8/2003
JP    2006-221270 A    8/2006
(Continued)

*Primary Examiner* — Yogeshkumar Patel
(74) *Attorney, Agent, or Firm* — Studebaker & Brackett PC

(57) ABSTRACT

An electronic device includes a microphone configured to receive input of speech and a processor configured to recognize the speech inputted to the microphone. The processor judges whether the state of the electronic device is a predetermined state when a voice command is recognized based on the speech inputted to the microphone. The processor executes a first process corresponding to the voice command when the processor judges that the state of the electronic device is the predetermined state and executes a second process corresponding to the voice command when the processor judges that the state of the electronic device is not the predetermined state. This electronic device improves the convenience of speech recognition.

20 Claims, 11 Drawing Sheets

(51) Int. Cl.
   *H04R 3/00* (2006.01)
   *H04R 29/00* (2006.01)
   *G06F 3/16* (2006.01)

(52) U.S. Cl.
   CPC ...... *H04R 29/004* (2013.01); *G10L 2015/223* (2013.01); *G10L 2015/228* (2013.01)

(58) Field of Classification Search
   CPC .......... G06F 3/167; G06F 3/042; G06F 3/043; H04R 3/00; H04R 29/004; H04R 2499/11
   See application file for complete search history.

(56) References Cited

U.S. PATENT DOCUMENTS

| | | |
|---|---|---|
| 2017/0161319 A1 | 6/2017 | Venkataraman et al. |
| 2017/0206896 A1* | 7/2017 | Ko .................. G06F 3/167 |
| 2017/0322648 A1* | 11/2017 | Jeong ............... G06F 21/32 |
| 2018/0061413 A1* | 3/2018 | Tanabe .............. G10L 15/22 |
| 2019/0271546 A1 | 9/2019 | Ueno et al. |

FOREIGN PATENT DOCUMENTS

| | | |
|---|---|---|
| JP | 2018-093461 A | 6/2018 |
| WO | 2017/095560 A1 | 6/2017 |

\* cited by examiner

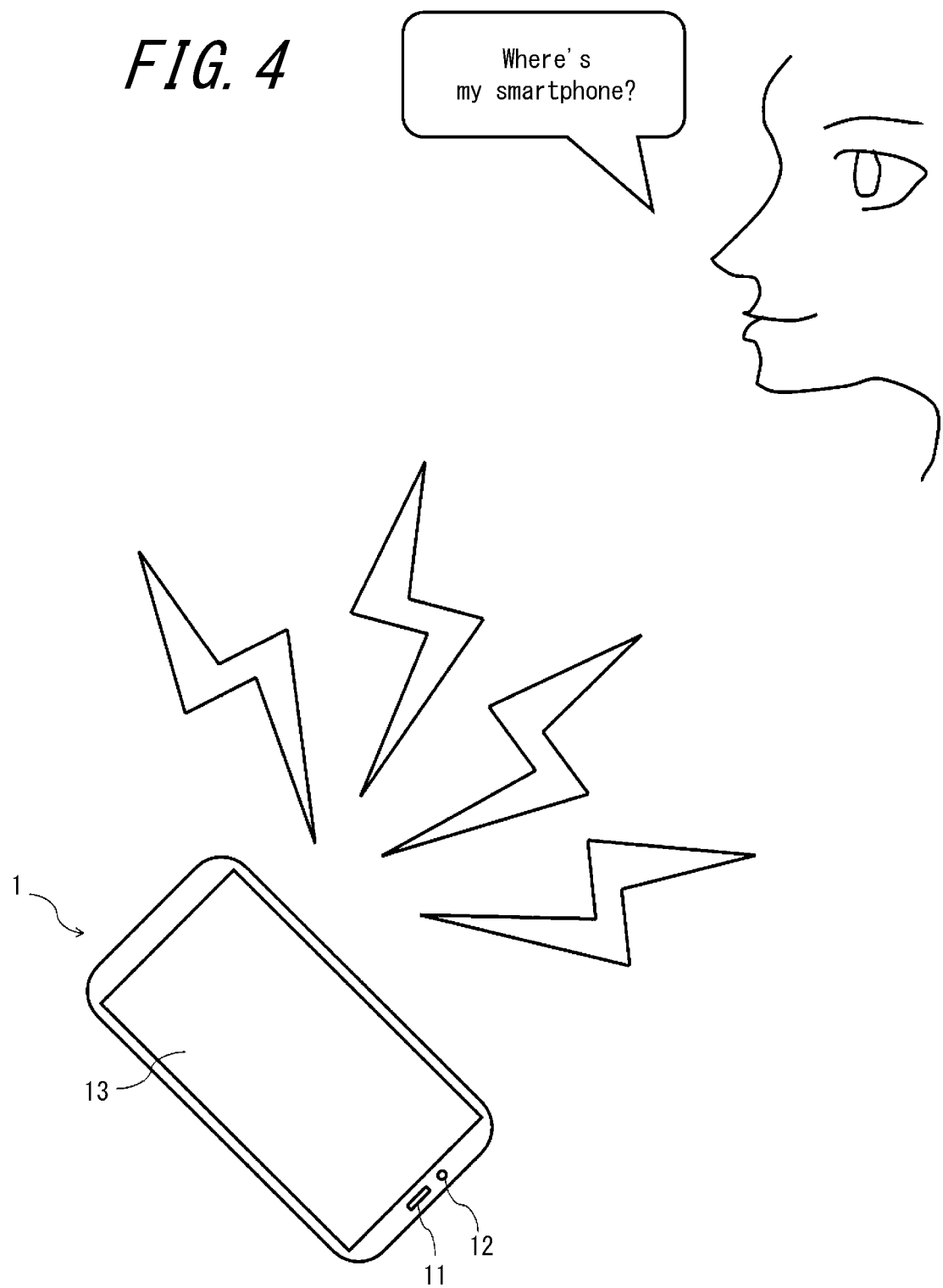

ELECTRONIC DEVICE WITH SPEECH RECOGNITION FUNCTION, CONTROL METHOD OF ELECTRONIC DEVICE WITH SPEECH RECOGNITION FUNCTION, AND RECORDING MEDIUM

TECHNICAL FIELD

The present disclosure relates to an electronic device with a speech recognition function. In particular, the present disclosure relates to an electronic device with an audio output function and a display function.

BACKGROUND

A technique for an electronic device to recognize speech input is known. For example, patent literature (PTL) 1 discloses a mobile terminal that includes a voice command registration unit 126A that registers a voice command defining execution of a call to a function of the mobile terminal, a voice command input button 121 for inputting speech from a microphone as a voice command while the button is being pressed, a voice command registration processing unit 141C that performs speech recognition processing on the speech inputted to the microphone while the voice command input button is pressed and causes the voice command registration unit to register the recognition result as a voice command, and a voice command processing unit 141B that, after the voice command input button is released, performs speech recognition processing on a voice command inputted to the microphone while the voice command input button was pressed, and when the recognition result matches a registered voice command and is accepted, executes a call to a function corresponding to the accepted voice command.

CITATION LIST

Patent Literature

PTL 1: JP2006-221270A

SUMMARY

Demand exists for more convenient speech recognition.

An electronic device according to an aspect includes a microphone configured to receive input of speech and a processor configured to recognize the speech inputted to the microphone. The processor judges whether the state of the electronic device is a predetermined state when a voice command is recognized based on the speech inputted to the microphone. The processor executes a first process corresponding to the voice command when the processor judges that the state of the electronic device is the predetermined state. The processor executes a second process corresponding to the voice command when the processor judges that the state of the electronic device is not the predetermined state.

A control method according to an aspect is a control method of an electronic device including a microphone configured to receive input of speech. The control method includes judging whether a state of the electronic device is a predetermined state when a voice command is recognized based on the speech inputted to the microphone, executing a first process corresponding to the voice command when it is judged that the state of the electronic device is the predetermined state, and executing a second process corresponding to the voice command when it is judged that the state of the electronic device is not the predetermined state.

A recording medium according to an aspect is a non-transitory computer-readable recording medium storing computer program instructions, which when executed by an electronic device including a microphone configured to receive input of speech, cause the electronic device to judge whether a state of the electronic device is a predetermined state when a voice command is recognized based on the speech inputted to the microphone, execute a first process corresponding to the voice command when it is judged that the state of the electronic device is the predetermined state, and execute a second process corresponding to the voice command when it is judged that the state of the electronic device is not the predetermined state.

An electronic device according to an embodiment of the present disclosure improves the convenience of speech recognition.

BRIEF DESCRIPTION OF THE DRAWINGS

In the accompanying drawings:

FIG. 4 illustrates example operations of an electronic device according to an embodiment;

DETAILED DESCRIPTION

Figure 1:
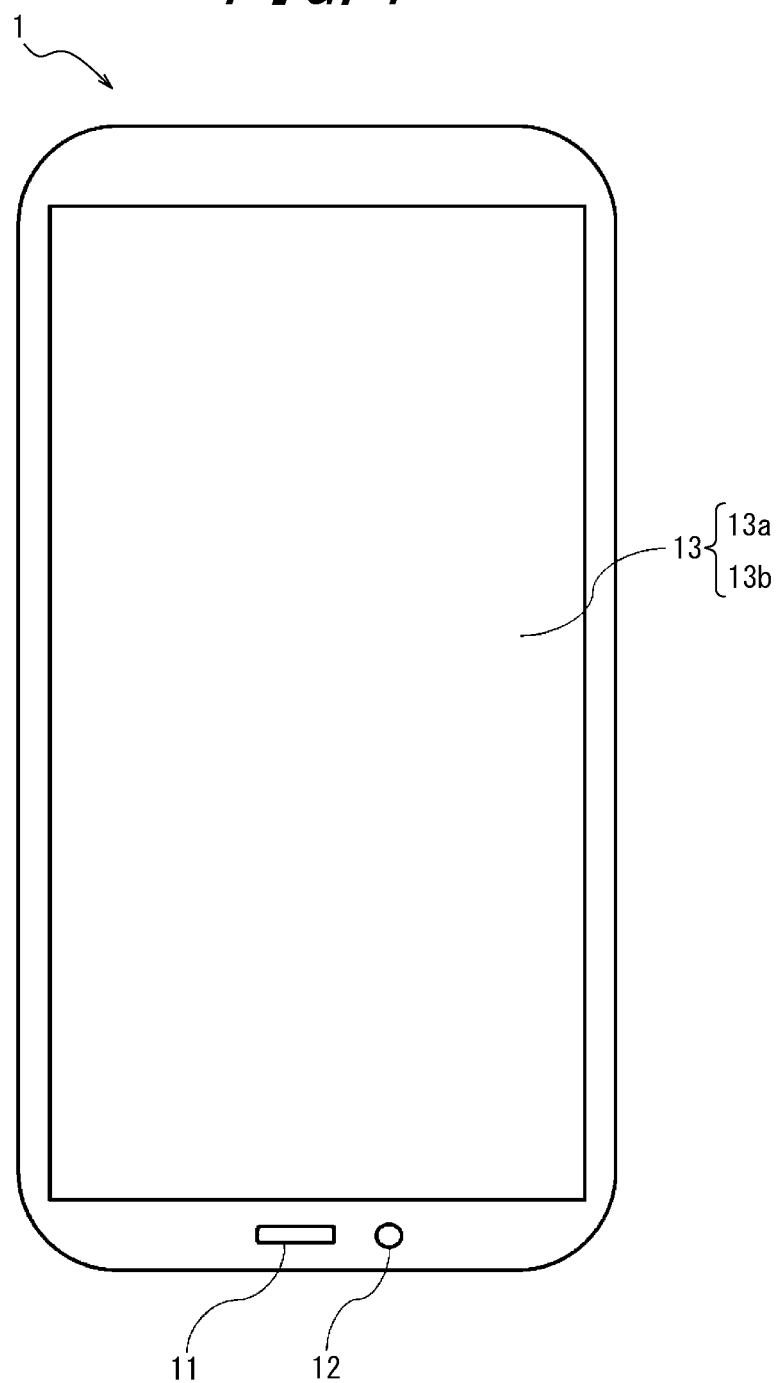
FIG. 1 is an external view of an electronic device according to an embodiment.

Embodiments of the present disclosure are described below with reference to the drawings. Similar constituent elements are labeled below with the same signs. Furthermore, a duplicate description is omitted.

It should be noted that the drawings are only schematic, and the ratios between dimensions in the drawings may differ from the actual ratios. Accordingly, specific dimensions and the like should be determined in light of the explanation below. The relationships or ratios of dimensions may also differ between different figures.

It should be noted that the expression "A or B" in reference to elements A, B, for example, in the present disclosure can mean "at least one of A and B." It should also be noted that the terms "can" "is able to" and "may" do not have the meaning of necessity (e.g. "must include") but rather permission (e.g. "could include"). The term "includes an element (or elements)" as used in the present disclosure means "includes, but is not limited to, an element (or elements)". The expression "may include an element" as used in the present disclosure means "may include, but need not include, an element". When expressions such as "configures" or "is configured by" are used for physical configurations, these expressions have a similar meaning to that of "includes". Furthermore, when expressions such as "configures" or "is configured by" are used to refer to the execution of a particular function with regard to a functional unit, a circuit, or the electronic device 1 itself, these expressions have the broad meaning of "is capable of executing a particular function, but whether the particular function is executed depends on conditions, and the particular function may, in some cases, not be executed".

The appearance of an electronic device 1 according to an embodiment is described with reference to FIG. 1. FIG. 1 is an external view of an electronic device 1 according to an embodiment.

The electronic device 1 encompasses devices such as smartphones.

The electronic device 1 according to an embodiment of the present disclosure is not, however, limited to being a smartphone. The electronic device 1 encompasses various devices that include at least an audio output function. Examples of the electronic device 1 include a feature phone, a tablet, a notebook computer, a smart speaker, a smart display, and a car navigation system. The electronic device 1 encompasses various other mobile terminals.

The electronic device 1 includes a microphone 11, a speaker 12, and a touch panel 13. The touch panel 13 includes a display 13a and a touch sensor 13b. In FIG. 1, the longitudinal direction of the electronic device 1 is defined as the up-down direction, and the transverse direction of the electronic device 1 is defined as the left-right direction.

The microphone 11 collects surrounding audio. The microphone 11 may be exposed at the front surface of the electronic device 1. The microphone 11 need not be exposed at the front surface of the electronic device 1. A plurality of microphones 11 may be provided in the electronic device 1.

The speaker 12 outputs audio. The speaker 12 may be exposed at the front surface of the electronic device 1. The speaker 12 need not be exposed at the front surface of the electronic device 1. A plurality of speakers 12 may be provided in the electronic device 1.

The touch panel 13 includes a display 13a and a touch sensor 13b. The touch sensor 13b and the display 13a may be formed integrally. The touch sensor 13b and the display 13a may be independent members. Examples of a touch panel 13 in which the touch sensor 13b and the display 13a are formed integrally include an in-cell touch panel and an on-cell touch panel.

The display 13a displays images such as characters, photographs, symbols, or graphics. Examples of the display 13a include a liquid crystal display (LCD), an organic electro-luminescence display (OELD), or an inorganic electro-luminescence display (IELD).

The touch sensor 13b detects contact by or proximity of the user's finger, a stylus, or the like. The touch sensor 13b is used as one way of receiving input to the electronic device 1. Any system may be used for detecting contact or proximity, such as a capacitive system, a resistive film system, a surface acoustic wave system, an infrared system, a load detection system, or the like. The touch sensor 13b transmits at least a portion of incident light.

The touch sensor 13b is positioned at least in partial overlap with the display 13a in plan view. In other embodiments, the touch sensor 13b may be positioned side-by-side with, or separated from, the display 13a.

Figure 2:
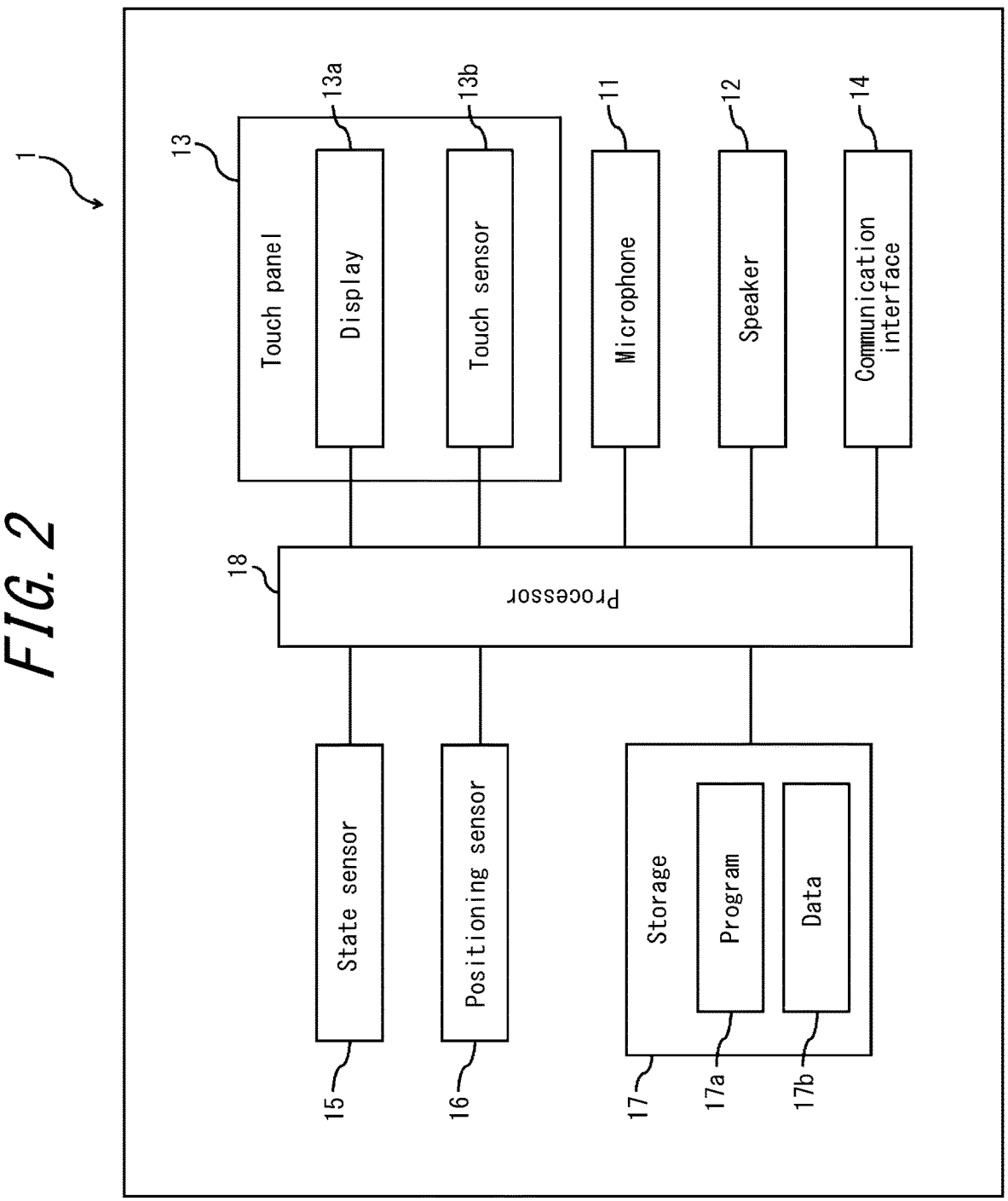
FIG. 2 is a block diagram of an electronic device according to an embodiment.

The functions of the electronic device 1 according to an embodiment are described with reference to FIG. 2. FIG. 2 is a block diagram of the electronic device 1 according to an embodiment.

The electronic device 1 includes the microphone 11, the speaker 12, the display 13a, the touch sensor 13b, a positioning sensor 16, a state sensor 15, a communication interface 14, a storage 17, and a processor 18.

The microphone 11 collects surrounding audio. The microphone 11 may perform A/D conversion on an electric signal and cause the electronic device 1 to output the resulting digital audio signal to the processor 18. The microphone 11 inputs an electric signal, corresponding to audio for which input was received, to the processor 18. The microphone 11 includes an audio input interface capable of communicating in a wired or wireless manner with an external microphone. The external microphone may, for example, be provided in an earphone, a smart speaker, or the like.

The speaker 12 outputs audio based on a signal inputted from the processor 18. An audio output function may perform a decoding process and D/A conversion on a digital audio signal from the processor 18 and cause the electronic device 1 to output audio based on the converted electric signal. The speaker 12 can output information of various programs and the like as audio. The speaker 12 includes an audio output interface capable of communicating in a wired or wireless manner with an external microphone or external speaker. The external speaker may, for example, be provided in an earphone, a smart speaker, or the like. A receiver that outputs the speech of a telephone call may be included in the speaker 12.

The display 13a displays images such as characters, photographs, symbols, or graphics based on a signal inputted from the processor 18.

The touch sensor 13b detects contact by or proximity of a finger or the like. The touch sensor 13b inputs a signal corresponding to the detected contact or proximity to the processor 18.

The communication interface 14 communicates with external apparatuses. Examples of the communication interface 14 include a physical connector and a wireless communication interface. Examples of physical connectors include an electrical connector corresponding to transmission by electric signals, an optical connector corresponding to transmission by optical signals, and an electromagnetic connector corresponding to transmission by electromagnetic waves. The electrical connector may be a universal terminal such as a universal serial bus (USB) terminal, a high-definition multimedia interface (HDMI® (HDMI is a registered trademark in Japan, other countries, or both)) terminal, Light Peak, Thunderbolt® (Thunderbolt is a registered trademark in Japan, other countries, or both), or a local area network (LAN) connector. Examples of the wireless communication interface include wireless communication interfaces that conform to a variety of standards. For example, wireless communication standards supported by wireless communication interfaces include cellular phone communication standards, such as 2G, 3G, or 4G, and short-range wireless communication standards. Examples of the cellular phone communication standards include long term evolution (LTE), wideband code division multiple access (W-CDMA), and worldwide interoperability for microwave access (WiMAX). Examples of short-range wireless communication standards include IEEE802.11, Bluetooth® (Bluetooth is a registered trademark in Japan, other countries, or both), infrared data association (IrDA), near field communication (NFC), and wireless personal area network (WPAN). Examples of communication standards for WPAN include ZigBee® (ZigBee is a registered trademark in Japan, other countries, or both).

The state sensor 15 detects the state of the electronic device 1 and inputs the detection result to the processor 18. The state sensor 15 includes an acceleration sensor. The state sensor 15 may further include a gyro sensor, a direction sensor, and the like. The acceleration sensor detects the direction and magnitude of acceleration acting on the electronic device 1. The gyro sensor detects the angle and the angular velocity of the electronic device 1. The direction sensor detects the orientation of the earth's magnetic field. The state sensor may further include an illuminance sensor. The illuminance sensor detects the amount of light irradiated on the electronic device 1.

The positioning sensor 16 acquires position information indicating the current location of the electronic device 1 and inputs the acquired result to the processor 18. For example, the positioning sensor 16 acquires the position of the electronic device 1 from a global positioning system (GPS) receiver or from a base station forming a wireless network with the communication interface 14.

The storage 17 stores programs 17a and data 17b. The storage 17 includes a non-transitory storage medium, such as a semiconductor storage medium or a magnetic storage medium. The storage 17 may also include a plurality of types of storage media. The storage 17 may include a combination of a portable storage medium, such as a memory card, optical disc, or magneto-optical disc, and an apparatus for reading the storage medium. The storage 17 may include a storage medium, such as a random access memory (RAM), that is also used as a working area to store results of processing by the processor 18 temporarily. The programs 17a stored in the storage 17 include applications that run in the foreground or the background, a control program that supports operations of the applications, and the like. The data 17b stored in the storage 17 includes the detection results of the touch sensor 13b, the input received by the audio input function, and the like.

The data 17b may include speech recognition dictionary data. The speech recognition dictionary data is data associating characteristic patterns (features) of speech with text. However, the speech recognition dictionary data need not be stored in the storage 17. The speech recognition dictionary data may be stored on a network that the electronic device 1 can access through the communication interface 14.

The processor 18 is electrically connected to the display 13a, the touch sensor 13b, the microphone 11, the speaker 12, the communication interface 14, the state sensor 15, the positioning sensor 16, and the storage 17. The processor 18 controls overall operations of the electronic device 1. Examples of the processor 18 include a central processing unit (CPU) and a micro control unit (MCU). The processor 18 may be a programmable logic device (PLD), such as a field-programmable gate array (FPGA). The processor 18 may be a dedicated processor that is specialized for particular processing or a universal processor that executes particular functions by reading particular programs. Examples of dedicated processors include a digital signal processor (DSP) and an application specific integrated circuit (ASIC). The processor 18 may be either a system-on-a-chip (SoC) with one processor or a plurality of processors that work together or a system-in-a-package (SiP).

The processor 18 can refer as necessary to the data 17b stored in the storage 17 and execute instructions included in the programs 17a stored in the storage 17. The processor 18 can then control functional components in accordance with the data 17b and the instructions, thereby implementing various functions. The processor 18 can change the control in response to detection results from detectors. The functional components include the speaker 12, the display 13a, and the communication interface 14, for example. The detectors include the microphone 11, the touch sensor 13b, the state sensor 15, and the positioning sensor 16, for example.

The processor 18 judges the type of gesture based on at least one of contact or proximity detected by the touch sensor 13b, the detected position, a change in the detected position, the duration of the contact or proximity, the interval between detection of contact or proximity, and the number of times contact is detected. A gesture is an operation performed on the touch sensor 13b with a finger. The operation performed on the touch sensor 13b may be performed on the touch panel 13 that includes the touch sensor 13b. Examples of gestures that can be distinguished by the processor 18 include, but are not limited to, a touch, a long touch, a release, a swipe, a tap, a double tap, a long tap, a drag, a flick, a pinch-in, and a pinch-out.

The processor 18 can judge a moving state of the electronic device 1 based on the result (such as the acceleration pattern) of detection by the state sensor 15 (such as an acceleration sensor). In other words, the electronic device 1 can judge the moving state of the user carrying the electronic device 1 based on the result of detection by the state sensor 15. Judgeable moving states include, but are not limited to, states in which the user is riding on a train, walking, driving, or riding in a car.

The processor 18 can judge a carrying state of the electronic device 1 based on the result (such as the acceleration pattern and amount of light) of detection by the state sensor 15 (such as an acceleration sensor and an illuminance sensor). In other words, the electronic device 1 can judge the way in which the user is carrying the electronic device 1 based on the result of detection by the state sensor 15. The judgeable carrying states include, but are not limited to, states in which the user is carrying the electronic device 1 in a bag or a backpack, in a pants pocket, and in a shirt pocket. When the processor 18 judges that the electronic device 1 is located in a closed space, the processor 18 can judge that the user is carrying the electronic device 1 in a bag or a backpack. When the processor 18 judges that the amount of light irradiated on one side of the electronic device 1 is less than the amount of light irradiated on the other side, the processor 18 can judge that the user is carrying the electronic device 1 in a shirt pocket. The processor 18 may also judge whether the electronic device 1 is located in the shirt pocket with the microphone 11 closer to the upper side or the lower side of the pocket based on the result of detection by the state sensor 15 and the positions of the state sensor 15 (for example, the illuminance sensor) and the microphone 11 in the electronic device 1.

The processor 18 can recognize speech inputted to the microphone 11 (speech recognition). The processor 18 may perform speech recognition processing by reading text from the speech recognition dictionary data, stored in the storage 17 or on a network accessible via the communication interface 14, based on the characteristic pattern of the inputted speech. When reading the text, the processor 18 refers to the speech recognition dictionary data and to the characteristic pattern of the inputted data and judges the degree of similarity.

When the processor 18 recognizes speech inputted to the microphone 11, the processor 18 can execute a process corresponding to the recognized speech. Examples of the process corresponding to the recognized speech include outputting audio, executing a function of the electronic device 1, changing a setting of the electronic device 1, performing an Internet search, launching an application stored on the electronic device 1, and executing a function of an application stored on the electronic device 1. The speech for executing a predetermined process is also referred to as a voice command. The speech that triggers the receipt of input of a voice command for executing a predetermined process is referred to as a voice trigger. The processor 18 can receive input of a voice command when the voice trigger is inputted to the microphone 11.

In an embodiment, the processor 18 may execute different processes in accordance with the state of the electronic device 1 when the voice command is recognized. For example, the processor 18 may execute different processes in accordance with the state of the electronic device 1 when the voice command is recognized. Settings may be changeable by the user. The settings need not include a setting to change the output destination of audio. Changing the output destination of audio refers, for example, to changing the output destination from the speaker 12 of the electronic device 1 to an external speaker. The processor 18 may, for example, execute different processes in accordance with the process being executed by the electronic device 1 when the voice command is recognized. At this time, the process executed by the electronic device 1 may be executed continuously from before until after processor 18 recognizes the speech inputted to the microphone 11. The processor 18 may, for example, execute different processes in accordance with an operation the user performs on the electronic device 1 within a predetermined time before the voice command is recognized. The processor 18 may, for example, execute different processes in accordance with the result of acquisition by the state sensor 15 when a voice command is recognized. The processor 18 may, for example, execute different processes in accordance with the result of acquisition by the positioning sensor 16 when a voice command is recognized.

The processor 18 may execute the same process regardless of the state of the electronic device 1 when the recognized speech is a predetermined voice command.

In another embodiment, the processor 18 may switch between a first mode of not standing by for speech input and a second mode of standing by for speech input in accordance with the state of the electronic device 1. For example, the processor 18 may set the electronic device 1 to the first mode of not standing by for speech input in accordance with a setting of the electronic device 1 or the process being executed by the electronic device 1. At this time, the processor 18 may switch the electronic device 1 to the second mode of standing by for speech input in accordance with the result of acquisition by the state sensor 15 or the result of acquisition by the positioning sensor 16.

In another embodiment, the processor 18 may cause the electronic device 1 to output information prompting the user for speech input when judging that the electronic device 1 satisfies a predetermined condition. The processor 18 may, for example, cause the electronic device 1 to output information prompting the user for speech input in accordance with a setting of the electronic device 1. The processor 18 may, for example, cause the electronic device 1 to output information prompting the user for speech input in accordance with the process being executed by the electronic device 1. The processor 18 may, for example, cause the electronic device 1 to output information prompting the user for speech input in accordance with an operation performed on the electronic device by the user within a certain time. The processor 18 may, for example, cause the electronic device 1 to output information prompting the user for speech input in accordance with the result of acquisition by the state sensor 15. The processor 18 may, for example, cause the electronic device 1 to output information prompting the user for speech input in accordance with the result of acquisition by the positioning sensor 16.

Figure 3A:
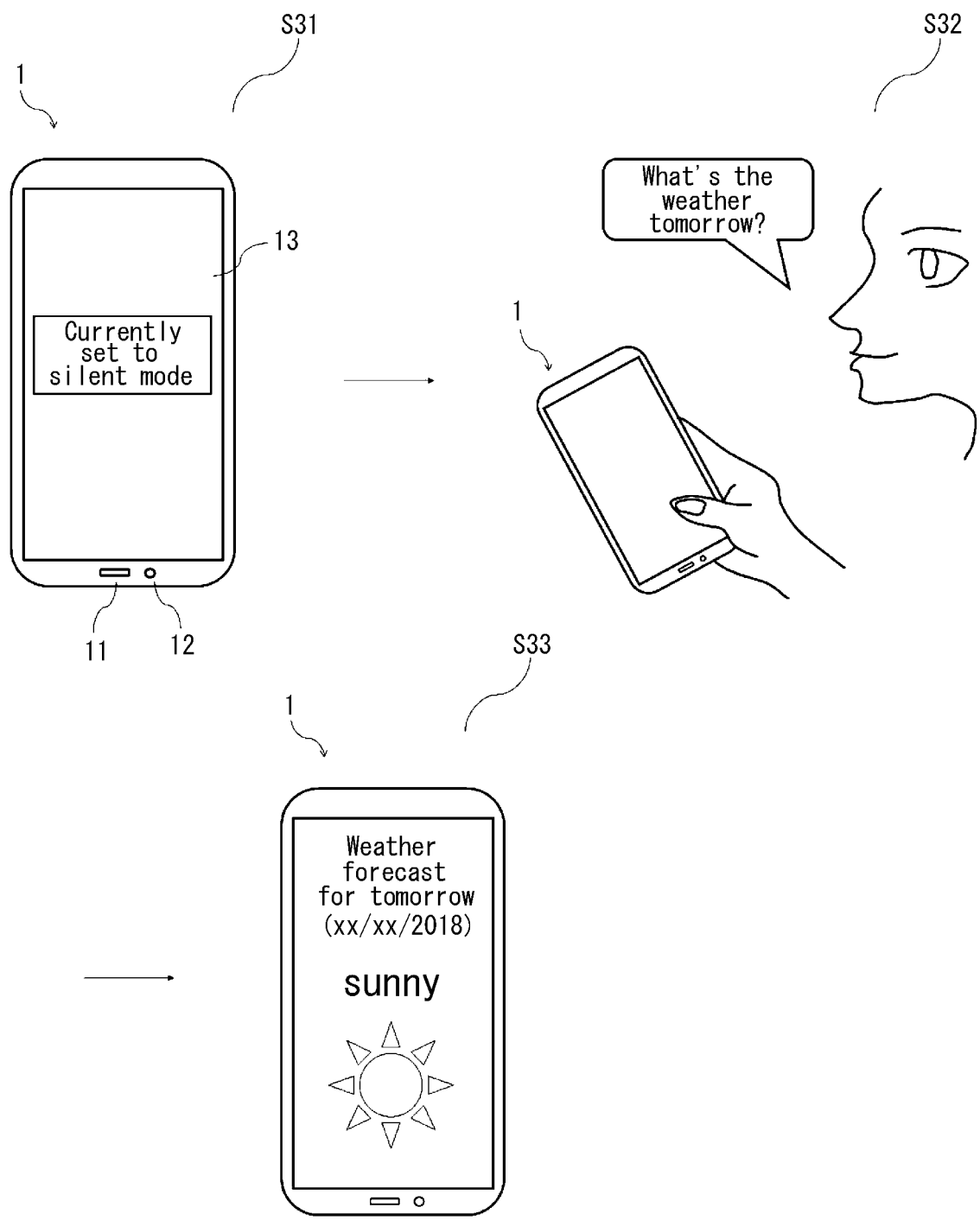
FIG. 3A illustrates example operations of an electronic device according to an embodiment.
Figure 3B:
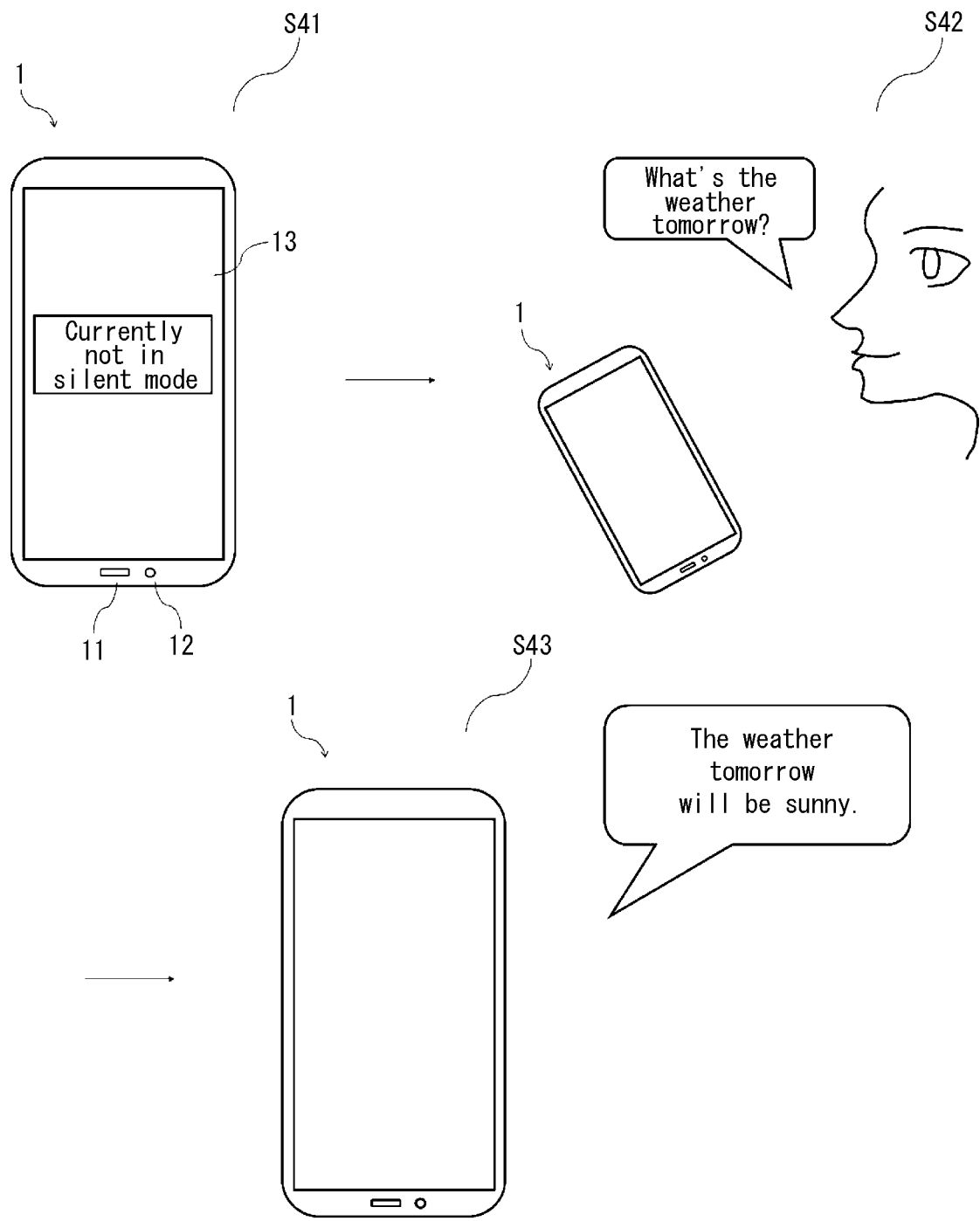
FIG. 3B illustrates example operations of an electronic device according to an embodiment.

The operations of the electronic device 1 according to an embodiment are described with reference to FIG. 3A and FIG. 3B. FIGS. 3A and 3B illustrate example operations executed by the electronic device 1 in response to speech input.

As described above, when the processor 18 recognizes a voice command based on speech inputted to the microphone 11, the processor 18 can execute different processes in accordance with the state of the electronic device 1. In greater detail, the processor 18 may judge whether the electronic device 1 is in a predetermined state when the processor 18 recognizes a voice command based on speech inputted to the microphone 11. The processor 18 may execute a first process corresponding to the recognized voice command when judging that the electronic device 1 is in the predetermined state. The processor 18 may execute a second process corresponding to the recognized voice command when judging that the electronic device 1 is not in the predetermined state.

As illustrated in FIG. 3A, the text "currently set to silent mode" is displayed on the display 13*a* of the electronic device 1 in step S31. This display indicates that the electronic device 1 is set to silent mode.

The user says, "what's the weather tomorrow?" in step S32. When the user says, "what's the weather tomorrow?", this speech is inputted to the microphone 11.

In step S33, the electronic device 1 recognizes the voice command "what's the weather tomorrow?" based on the speech inputted to the microphone 11. Consequently, text and an image that are related to the next day's weather are displayed on the display 13*a* of the electronic device 1. The image includes an object. Specifically, the text "weather forecast for tomorrow (xx/xx/2018)" and "sunny", along with an object depicting the sun to indicate sunny weather, are displayed on the display 13*a*.

As illustrated in FIG. 3B, the text "currently not in silent mode" is displayed on the display 13*a* of the electronic device 1 in step S41. This display indicates that the electronic device 1 is not set to silent mode.

The user says, "what's the weather tomorrow?" in step S42. When the user says, "what's the weather tomorrow?", this speech is inputted to the microphone 11.

In step S34, the electronic device 1 recognizes the voice command "what's the weather tomorrow?" based on the speech inputted to the microphone 11. Consequently, the audio "the weather tomorrow will be sunny" is outputted from the speaker 12 of the electronic device 1.

In this way, when a voice command is recognized based on speech inputted into the microphone 11 while the electronic device 1 is in silent mode, the display 13*a* can be caused to display an image in accordance with the content of the recognized voice command. The state of being set to silent mode is an example of the predetermined state. The process to cause the display 13*a* to display an image is an example of the first process. At this time, the electronic device 1 may cause the display 13*a* to display the image without causing the speaker 12 to output audio. Conversely, when a voice command is recognized based on speech inputted into the microphone 11 while the electronic device 1 is not in silent mode, the speaker 12 can be caused to output audio in accordance with the content of the recognized voice command. The process to cause the speaker 12 to output audio is an example of the second process. At this time, the electronic device 1 may cause the display 13a to display an image as well as causing the speaker 12 to output audio.

Examples of the predetermined condition are not limited to being set to silent mode. When it is judged that the moving state of the user is a first moving state based on the result of detection by the state sensor 15, and a voice command is recognized based on speech inputted to the microphone 11, the electronic device 1 may cause an image to be displayed on the display 13a. Conversely, when it is judged that the moving state of the user is not the first state, or when it is judged that the moving state of the user is a second state, and a voice command is recognized based on speech inputted to the microphone 11, the electronic device 1 may cause the speaker 12 to output audio in accordance with the content of the recognized voice command. The first moving state includes a state in which the user is riding on a train. The second moving state includes states in which the user is walking, driving, or riding in a car. The first moving state is an example of the predetermined state.

When it is judged that the moving state of the user is the second moving state, and a voice command is recognized based on speech inputted to the microphone 11, the electronic device 1 may cause the speaker 12 to output audio in accordance with the content of the recognized voice command even when the electronic device 1 is set to silent mode.

In another embodiment, when it is judged that the position information acquired by the positioning sensor 16 is registered position information (such as the user's home), and a voice command is recognized based on speech inputted to the microphone 11, the electronic device 1 may cause the speaker 12 to output audio in accordance with the content of the recognized voice command even when the electronic device 1 is set to silent mode.

In another embodiment, when the communication interface connects to a predetermined external device, and a voice command is recognized based on speech inputted to the microphone 11, the electronic device 1 may cause the speaker 12 to output audio in accordance with the content of the recognized voice command even when the electronic device 1 is set to silent mode. An example of the predetermined external device is a wireless LAN apparatus. The wireless LAN apparatus may be an apparatus installed in the user's home. Another example of the external apparatus is a Bluetooth® apparatus (Bluetooth is a registered trademark in Japan, other countries, or both). The Bluetooth® apparatus may be an apparatus for fishing (for example, a fish finder or a fish bite sensor).

In another embodiment, when it is judged that the electronic device 1 is located in the pocket of a shirt the user is wearing, with the microphone 11 closer to the upper side of the pocket, based on the result of detection by the state sensor 15, then the electronic device 1 may cause the speaker 12 to output audio in accordance with the content of the recognized voice command even when the electronic device 1 is set to silent mode. In other words, the electronic device 1 may execute the second process for the recognized voice command in accordance with the result of detection by the state sensor 15, even when a predetermined setting has been made to execute the first process for the voice command. In another embodiment, when it is judged that the moving state of the user is the second state, and that the electronic device 1 is located in the pocket of a shirt the user is wearing, with the microphone 11 closer to the upper side of the pocket, then the electronic device 1 may cause the speaker 12 to output audio in accordance with the content of the recognized voice command even when the electronic device 1 is set to silent mode.

The operations of the electronic device 1 according to an embodiment are described with reference to FIG. 4. FIG. 4 illustrates another example of operations executed in accordance with speech input.

As described above, the processor 18 can execute the same process regardless of the state of the electronic device 1 when the recognized speech is a predetermined voice command. In greater detail, the processor 18 may execute the second process regardless of the state of the electronic device 1 when the recognized speech is the first voice command.

As illustrated in FIG. 4, the user of the electronic device 1 says "where's my smartphone?". When the user of the electronic device 1 says "where's my smartphone?", this speech is inputted to the microphone 11. The electronic device 1 recognizes the voice command "where's my smartphone?" based on the speech inputted to the microphone 11. Consequently, audio is outputted from the speaker 12 of the electronic device 1 regardless of the state of the electronic device 1. The audio may be outputted as speech or as a mechanical sound.

In this way, when the recognized speech is an inquiry about the position of the electronic device 1, the electronic device 1 can cause the speaker 12 to output audio regardless of the state of the electronic device 1. The inquiry about the position of the electronic device 1 is an example of the first voice command. The process to cause the speaker 12 to output audio is an example of the second process.

Figure 5:
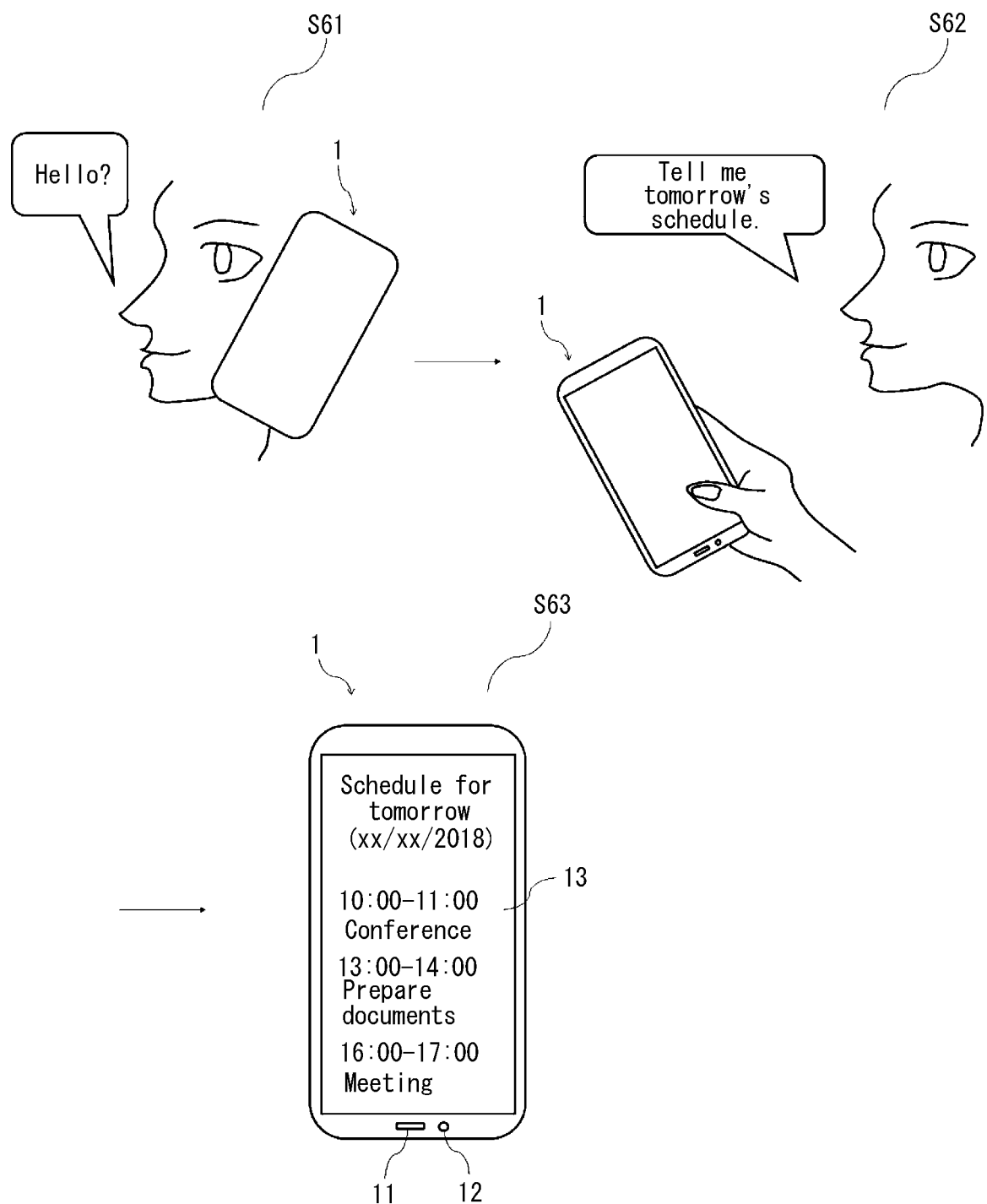
FIG. 5 illustrates example operations of an electronic device according to an embodiment.

The operations of the electronic device 1 according to an embodiment are described with reference to FIG. 5. FIG. 5 illustrates another example of operations for a process executed in accordance with the state of the electronic device 1.

As described above, the processor 18 can switch between a first mode of not standing by for speech input and a second mode of standing by for speech input. In greater detail, the processor 18 may judge whether the electronic device 1 is in the first state, and if so, set the electronic device 1 to the first mode of not standing by for speech input. Subsequently, the processor 18 may judge whether the electronic device 1 is in the second state, and if so, set the electronic device 1 to the second mode of standing by for speech input.

In step S61, the electronic device 1 executes a phone call process. While the phone call process is being executed, the electronic device 1 is set to the first mode of not standing by for speech input. Here, the user says "hello". When the user says "hello", this speech is inputted to the microphone 11. At this time, the speech "hello" is not recognized as a voice command, but rather as phone call audio. Particular speech, such as "bye-bye", may be recognized simultaneously as phone call audio and as a voice command for ending the phone call process.

The user separates the electronic device 1 from the ear in step S62. Based on the result of detection by the state sensor 15, the electronic device 1 judges at this time that the electronic device 1 has changed from a state of an object being nearby to a state of an object not being nearby. When it is judged that an object is not nearby the electronic device 1, the electronic device 1 switches to the second mode of standing by for speech input, even if the phone call process is still underway. Here, the user says, "tell me tomorrow's schedule". When the user says, "tell me tomorrow's schedule", this speech is inputted to the microphone 11.

In step S63, the electronic device 1 recognizes the voice command "tell me tomorrow's schedule" based on the speech inputted to the microphone 11. Consequently, the following day's schedule is displayed on the display 13a of the electronic device 1. The schedule is set on the electronic device 1 by user input, set in the user's account, or the like.

While executing the phone call process, the electronic device 1 is thus set to the first mode of not standing by for speech input. When it is judged that an object is not nearby the electronic device 1, the electronic device 1 switches to the second mode of standing by for speech input, even if the phone call process is still underway. The state in which the electronic device 1 is executing the phone call process is an example of the first state. The state in which an object is not near the electronic device 1 during a phone call is an example of the second state. Alternatively, the electronic device 1 may switch to the second mode of standing by for speech input even when the phone call process is underway only when the electronic device 1 judges that an object is not near the electronic device 1 and that the phone call process is not being executed in speakerphone mode.

Figure 6:
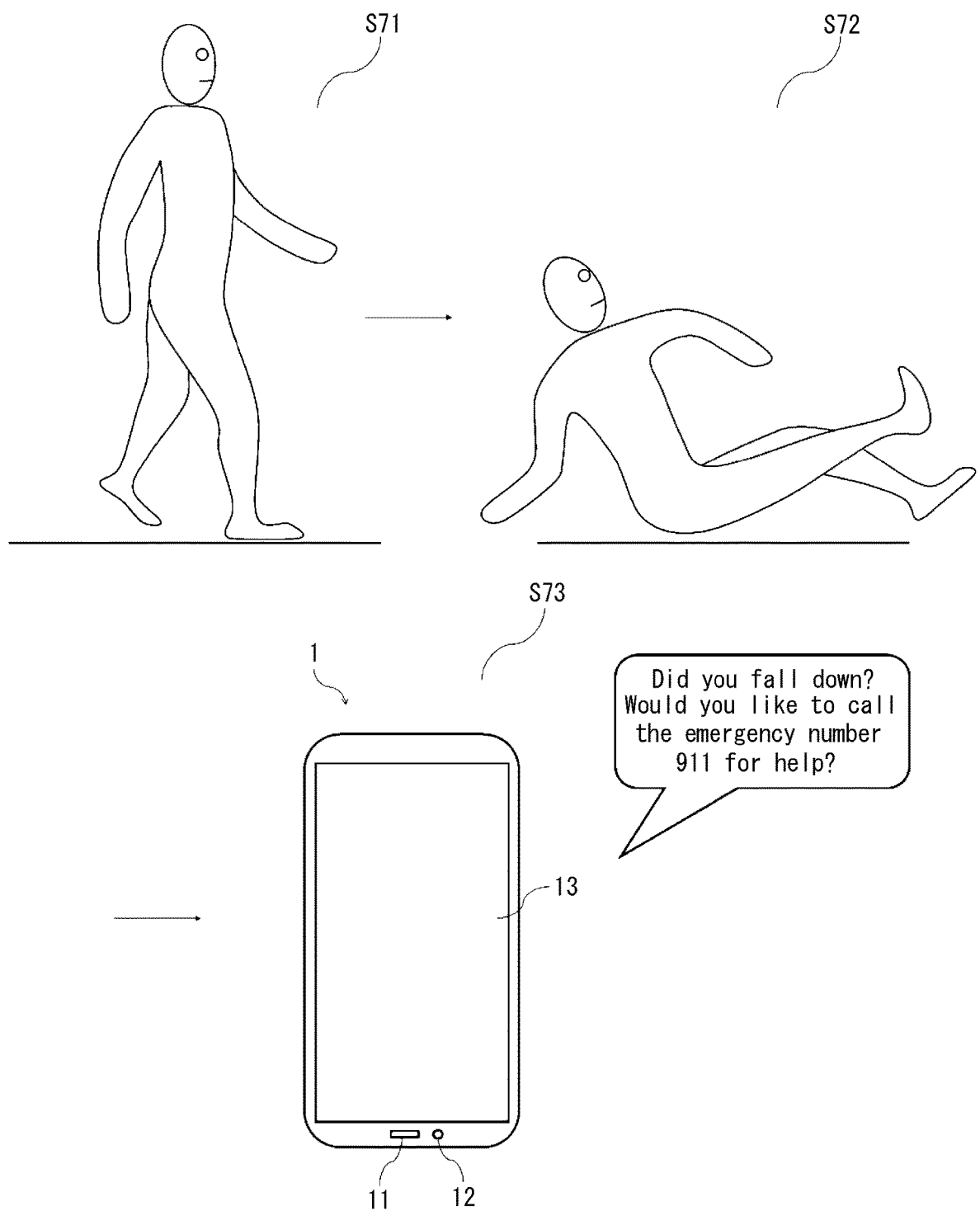
FIG. 6 illustrates example operations of an electronic device according to an embodiment.
Figure 7:
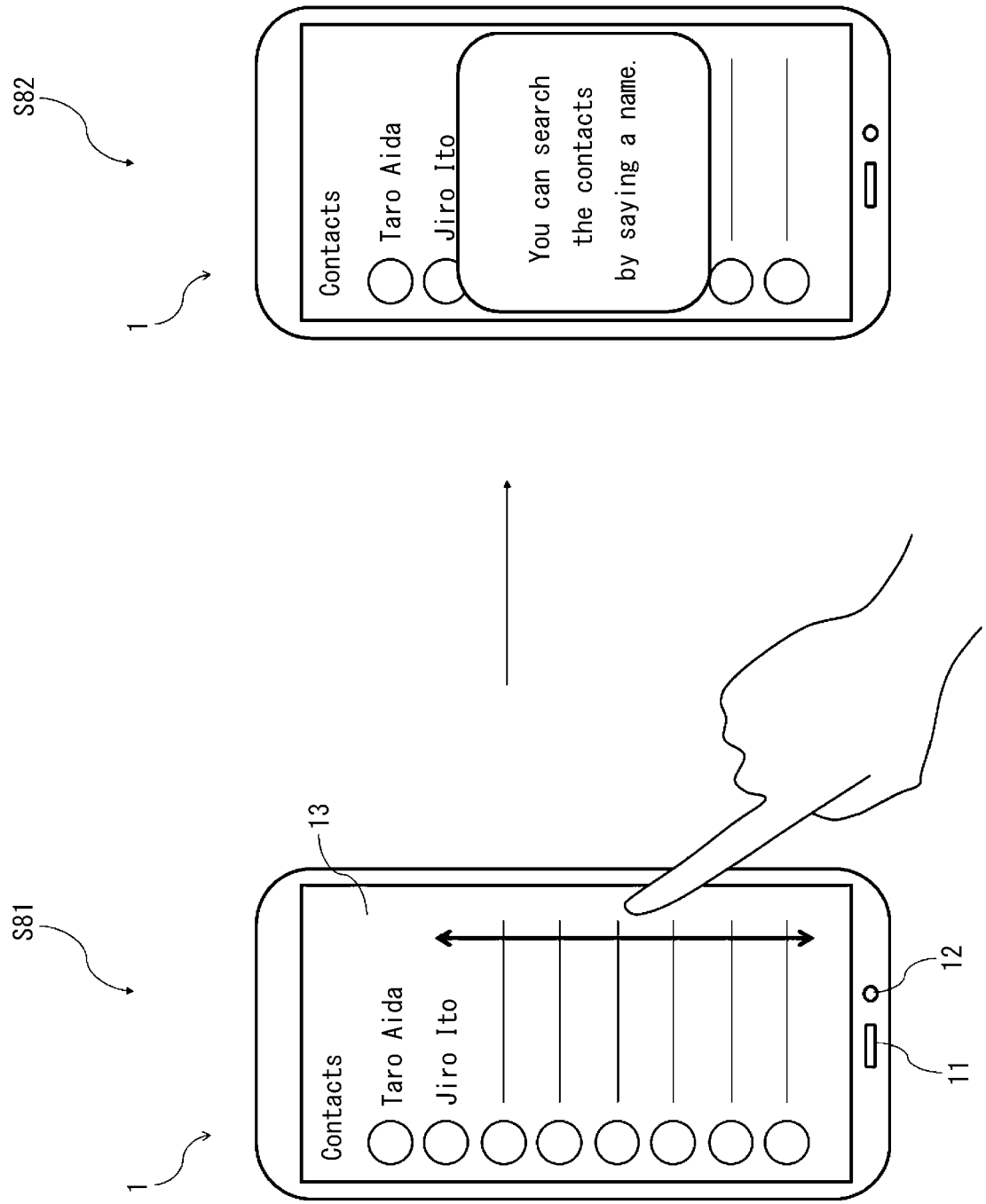
FIG. 7 illustrates example operations of an electronic device according to an embodiment.

The operations of the electronic device 1 according to an embodiment are described with reference to FIGS. 6 and 7. FIGS. 6 and 7 illustrate another example of operations for a process executed in accordance with the state of the electronic device 1.

As described above, the processor 18 can cause the electronic device 1 to output information prompting the user for speech input when judging that the electronic device 1 satisfies a predetermined condition.

As illustrated in FIG. 6, the user is walking in step S71. The user is carrying the electronic device 1 at this time. The electronic device 1 judges that the user is walking based on the result of detection by the state sensor 15.

The user falls down in step S72. At this time, the electronic device 1 judges that the user has fallen down based on the result of detection by the state sensor 15.

In step S73, the audio "Did you fall down? Would you like to call the emergency number 911 for help?" is outputted from the speaker 12 of the electronic device 1.

In this way, the electronic device 1 can cause the speaker 12 to output information prompting the user for speech input when judging that the user of the electronic device 1 has fallen down based on the result acquired by the state sensor 15. The user falling down is an example of satisfying a predetermined condition. The information prompting the user for speech input may, for example, include an inquiry of whether to execute a predetermined process. The predetermined process may be to dial a predetermined telephone number. After causing the output interface to output the inquiry, the electronic device 1 may receive speech input of the response to the inquiry. The electronic device 1 executes the predetermined process when a response to the inquiry indicating to execute the predetermined process is inputted to the microphone 11. The response indicating to execute the predetermined process is a voice command. When judging that a predetermined condition is satisfied, the processor 18 may receive input of a voice command regardless of whether the voice trigger has been inputted.

As illustrated in FIG. 7, a contact list is displayed on the display 13a of the electronic device 1 in step S81. The contact list can be displayed on the display 13a by execution of a predetermined application or the like. The user is scrolling the display screen of the display 13a by performing a swipe operation on the screen displaying the contact list.

In step S81, the text "You can search the contacts by saying a name" is displayed on the display 13a of the electronic device 1.

In this way, the electronic device 1 may output information prompting the user for speech input when the display screen is scrolled a predetermined distance or a predetermined number of times within a certain time during execution of a predetermined application. The electronic device 1 may also output information prompting the user for speech input when judging that a predetermined user operation has been performed a predetermined number or times or more within a certain time. The predetermined user operation is, for example, a swipe operation. The display screen being scrolled a predetermined distance within a certain time during execution of the predetermined application, the display screen being scrolled a predetermined number of times within a certain time, and a predetermined user operation being performed a predetermined number of times or more on the touch panel 13 within a certain time are examples of satisfying a predetermined condition. Examples of the information prompting the user for speech input include an indication that speech input is possible, an indication of a recognizable voice command or the content of the recognizable voice command, and the content of a predetermined process to be executed by the voice command. When judging that a predetermined condition is satisfied, the processor 18 may receive input of a voice command regardless of whether the voice trigger has been inputted. Here, the voice command received regardless of whether the voice trigger has been inputted may be a voice command outputted by the speaker 12 or displayed on the display 13a. When the voice command is inputted to the microphone 11, the processor 18 executes the predetermined process to be executed by the voice command. The predetermined process may include a process to select one element from a predetermined list.

Examples of satisfying a predetermined condition are not limited to the judgment that the user of the electronic device 1 has fallen down and the judgment that a predetermined user operation has been performed a predetermined number of times of more within a certain time. For example, the electronic device 1 may output information prompting the user for speech input when a phone call is received. At this time, the information prompting the user for speech input is, for example, the audio "Incoming call from A. Would you like to answer?". The electronic device 1 may, for example, output information prompting the user for speech input when an email is received. At this time, the information prompting the user for speech input is, for example, the audio "Email received. Would you like the message read aloud?".

The electronic device 1 may, for example, output information prompting the user for speech input when a predetermined application is launched or is running, such as a navigation application to be used while driving or a recipe viewing application to be used while cooking. At this time, the information prompting the user for speech input is, for example, the audio "state the destination", "speech input is possible without a voice trigger during recipe viewing", or the like.

Figure 8:
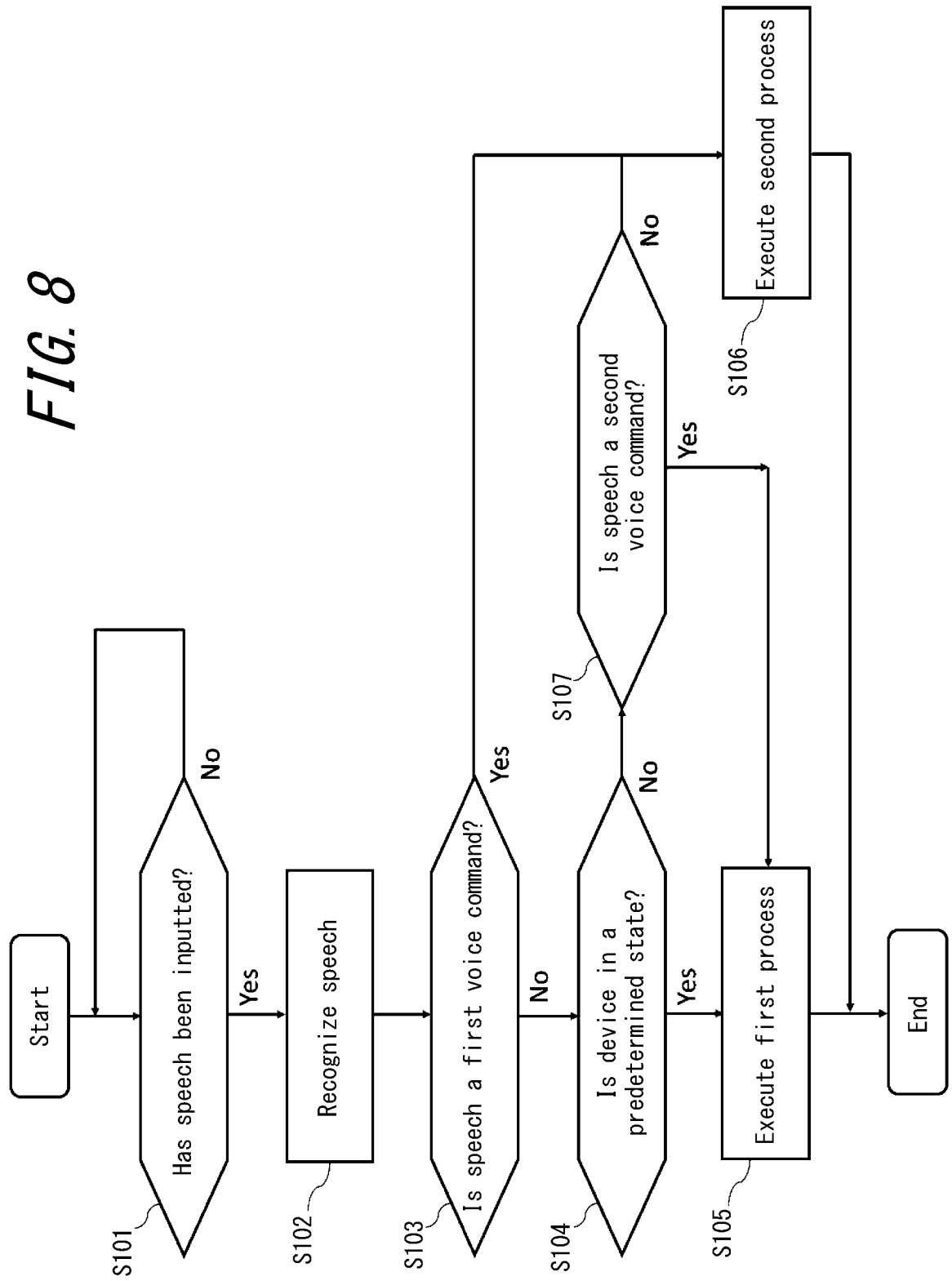
FIG. 8 is a flowchart illustrating an example of control performed by an electronic device according to an embodiment.

The control of the electronic device 1 according to an embodiment is described with reference to FIG. 8. FIG. 8 is a flowchart illustrating an example of control executed in accordance with the state of the electronic device 1.

Step S101: the processor 18 judges whether speech has been inputted to the microphone 11. When the processor 18 judges that speech has been inputted to the microphone 11

(step S101: Yes), the process proceeds to step S102. When the processor 18 judges that speech has not been inputted to the microphone 11 (step S101: No), the processor 18 repeats step S101.

Step S102: the processor 18 recognizes the inputted speech.

Step S103: the processor 18 judges whether the recognized speech is the first voice command. When the processor 18 judges that the recognized speech is the first voice command (step S103: Yes), the process proceeds to step S106. When the processor 18 judges that the recognized speech is not the first voice command (step S103: No), the process proceeds to step S104.

Step S104: the processor 18 judges whether the electronic device 1 is in a predetermined state. When the processor 18 judges that the electronic device 1 is in a predetermined state (step S104: Yes), the process proceeds to step S105. When the processor 18 judges that the electronic device 1 is not in a predetermined state (step S104: No), the process proceeds to step S107.

Step S105: the processor 18 executes the first process on the electronic device 1 and terminates the present process.

Step S106: the processor 18 executes the second process on the electronic device 1 and terminates the present process.

Step S107: the processor 18 judges whether the recognized speech is the second voice command. When the processor 18 judges that the recognized speech is the second voice command (step S107: Yes), the process proceeds to step S105. When the processor 18 judges that the recognized speech is not the second voice command (step S103: No), the process proceeds to step S106.

As described above, the predetermined state includes a state in which the electronic device 1 is set to silent mode and a state in which the moving state of the electronic device 1 is movement on a train. The first voice command includes an inquiry about the position of the electronic device 1. The first process includes a process to cause the display 13a to display an image.

The second process includes a process to cause the speaker 12 to output audio.

As illustrated in FIG. 8, the processor 18 in an embodiment may execute the first process when the recognized speech is the second voice command, even when the electronic device 1 is judged not to be in the predetermined state. The processor 18 may also execute the second process when the electronic device 1 is judged not to be in the predetermined state and the recognized speech is not the second voice command. Examples of the second voice command include commands for which the process to be executed does not require audio output, such as a command to launch an application or a command to place a phone call. In other words, the second voice command includes commands that do not require the output of text. The cases in which the output method of a process corresponding to a voice command is set in the settings of the electronic device 1 is not limited to this example. For example, the electronic device 1 can set the process corresponding to a voice command to screen display only. In this case, the processor 18 may execute the first process even when judging that the electronic device 1 is not in a predetermined state and the recognized voice command is neither the first voice command nor the second voice command. The voice command "what's the weather tomorrow?" in FIG. 3A and FIG. 3B has been described as a voice command for causing the speaker 12 to output audio when the device is not in a predetermined state, i.e. a different voice command from the second voice command. It is to be noted that this voice command may also be the second voice command.

The electronic device 1 according to the above embodiment displays images and outputs audio appropriately for voice commands in accordance with conditions. The user can therefore use the speech recognition function without worrying about the surrounding conditions. Furthermore, the processing corresponding to a particular voice command is fixed, which can reduce the probability of execution of a process not intended by the user. This increases the convenience of speech recognition.

Figure 9:
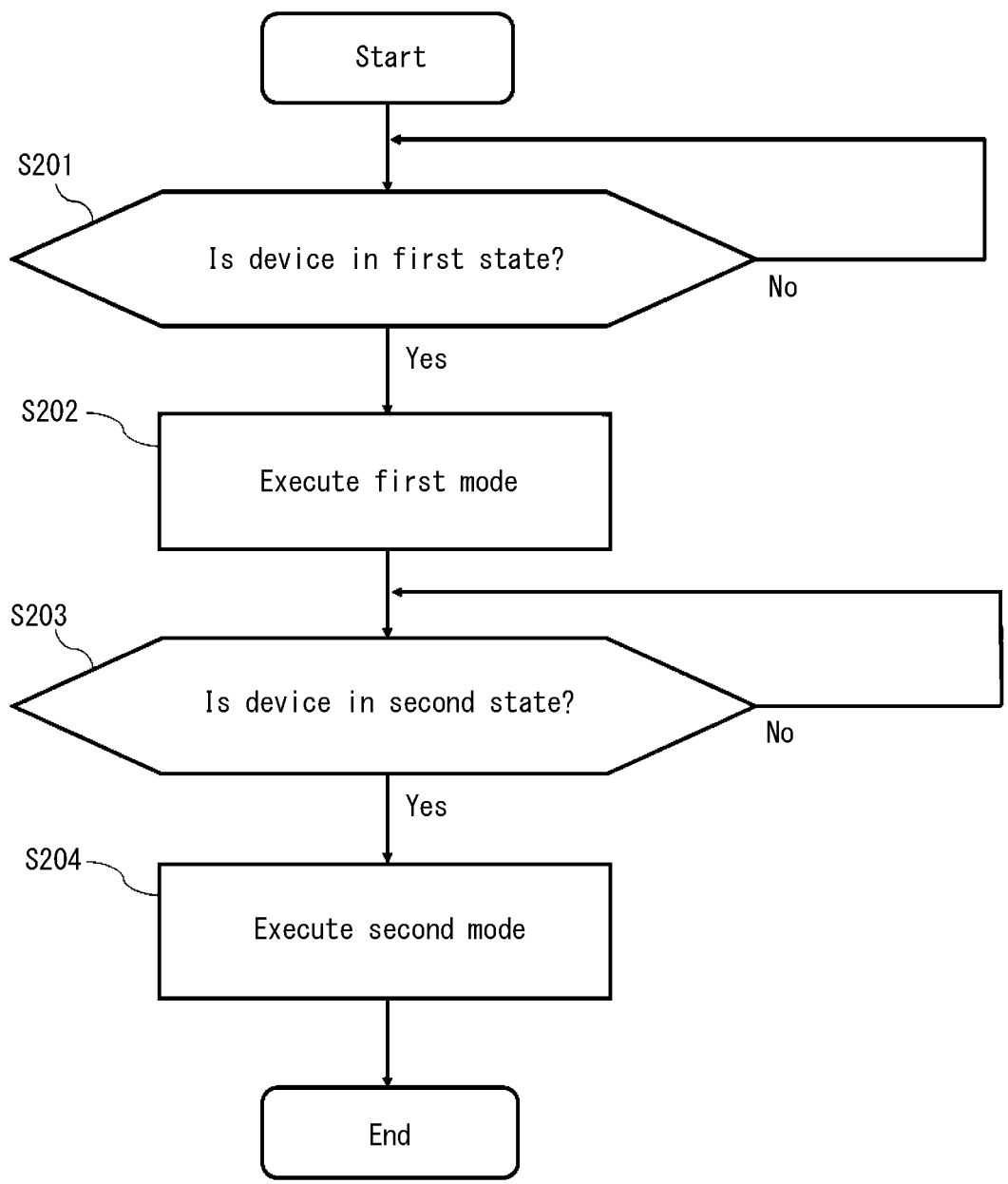
FIG. 9 is a flowchart illustrating an example of control performed by an electronic device according to an embodiment.

The control of the electronic device 1 according to an embodiment is described with reference to FIG. 9. FIG. 9 is a flowchart illustrating an example of control executed in accordance with the state of the electronic device 1.

Step S201: the processor 18 judges whether the electronic device 1 is in the first state. When the processor 18 judges that the electronic device 1 is in the first state (step S201: Yes), the process proceeds to step S202. When the processor 18 judges that the electronic device 1 is not in the first state (step S201: No), the processor 18 repeats step S201.

Step S202: the processor 18 sets the electronic device 1 to the first mode of not standing by for speech input.

Step S203: the processor 18 judges whether the electronic device 1 is in the second state. When the processor 18 judges that the electronic device 1 is in the second state (step S203: Yes), the process proceeds to step S204. When the processor 18 judges that the electronic device 1 is not in the second state (step S203: No), the processor 18 repeats step S201.

Step S204: the processor 18 sets the electronic device 1 to the second mode of standing by for speech input.

As described above, the first state includes being in a phone call. The second state includes a state in which the electronic device 1 is separated from an object (such as the user's face) during a phone call.

The electronic device 1 according to the above embodiment allows input of a voice command in accordance with the user's intentions even when input of voice commands is normally restricted. This increases the convenience of speech recognition.

Figure 10:
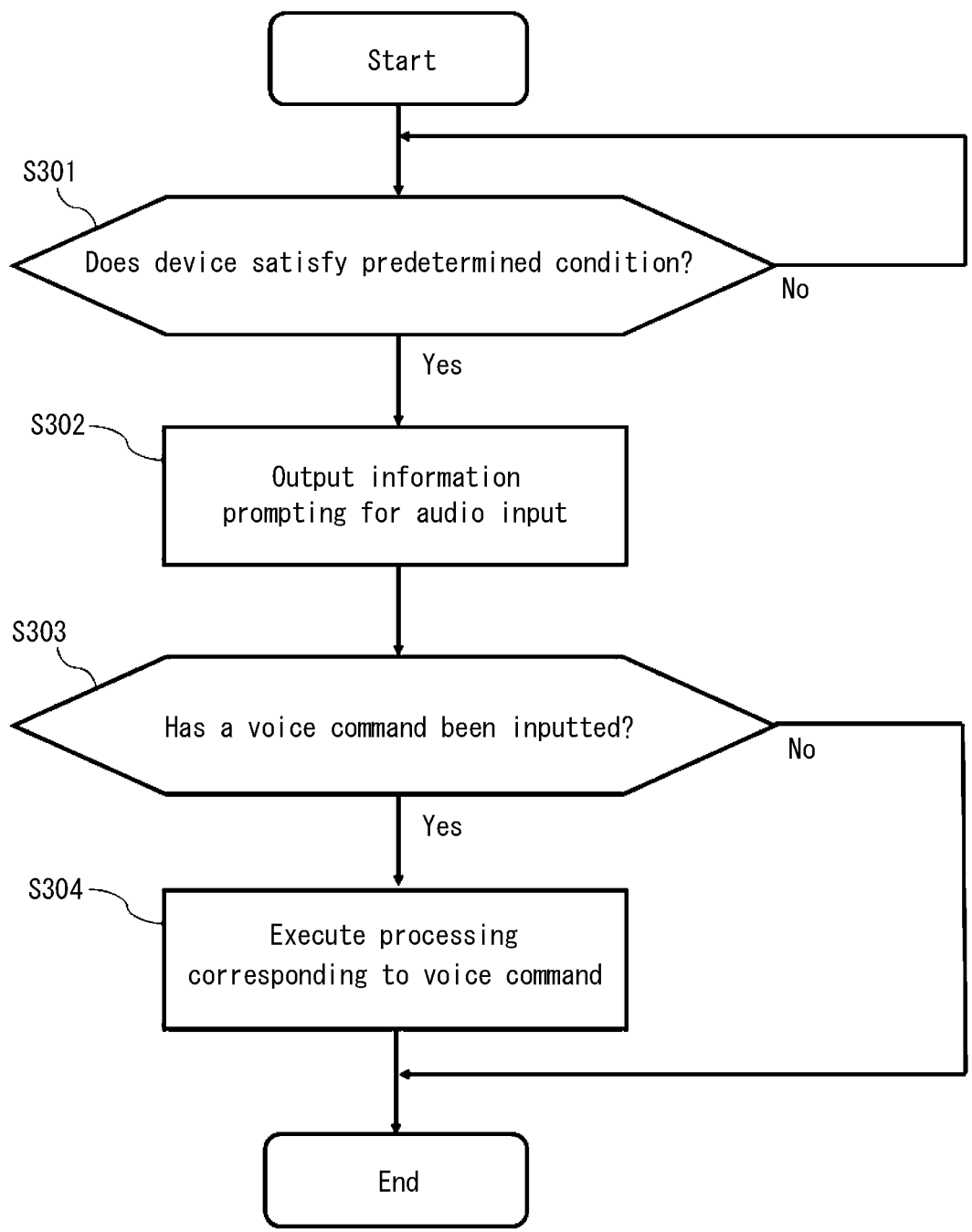
FIG. 10 is a flowchart illustrating an example of control performed by an electronic device according to an embodiment.

The control of the electronic device 1 according to an embodiment is described with reference to FIG. 10. FIG. 10 is a flowchart illustrating another example of control executed in accordance with the state of the electronic device 1.

Step S301: the processor 18 judges whether the electronic device 1 satisfies a predetermined condition. When the processor 18 judges that the electronic device 1 satisfies a predetermined condition (step S301: Yes), the process proceeds to step S302. When the processor 18 judges that the electronic device 1 does not satisfy a predetermined condition (step S301: No), the processor 18 repeats step S301.

Step S302: the processor 18 causes the electronic device 1 to output information prompting the user for speech input.

Step S303: the processor 18 judges whether a voice command has been inputted to the microphone 11 within a certain time after the electronic device 1 outputted the information prompting the user for speech input. When the processor 18 judges that a voice command has been inputted to the microphone 11 (step S303: Yes), the process proceeds to step S304. The processor 18 terminates the process when judging that a voice command has not been inputted to the microphone 11 (step S303: No). In step S303, the processor 18 need not require input of a voice trigger.

Step S304: the processor 18 executes the process corresponding to the voice command inputted to the microphone 11.

As described above, examples of satisfying a predetermined condition include the judgment that the user has fallen down, the display screen being scrolled a predetermined distance or a predetermined number of times within a certain time during execution of a predetermined application (or the judgment that a swipe operation has been performed a predetermined number of times or more), receipt of a phone call, receipt of email, and a predetermined application being launched or running. Examples of the information prompting the user for speech input include an indication that speech input is possible, an indication of a recognizable voice command or the content of the recognizable voice command, and the content of a predetermined process to be executed by the voice command.

The timing for outputting the information prompting the user for speech input may be within a certain time from the judgment that a predetermined condition is satisfied, but this example is not limiting. The processor may, for example, change the mode of the electronic device 1 to a mode (third mode) allowing an incoming phone call to be taken by speech input when it is judged that a predetermined condition is satisfied. When a phone call is actually received, the processor may cause the electronic device 1 to output information indicating that the phone call may be taken by speech input. At this time, examples of the predetermined condition being satisfied include the judgment that the user is driving a car based on the result of detection by the state sensor 15, the judgment that the user is at home based on the position information acquired by the positioning sensor 16, the judgment that the electronic device 1 is located in the pocket of a shirt the user is wearing, with the microphone 11 closer to the upper side of the pocket, based on the result of detection by the state sensor 15, and the like. Additionally, the ringtone of an incoming call and the vibration pattern of a vibration unit may be changed in the third mode. Changing the ringtone or the vibration pattern may, for example, refer to extending the time during which the ringtone or vibration is suspended when a phone call is received. This configuration can increase the probability of a voice command being recognized, since voice commands tend to be difficult to recognize while the phone is ringing or vibrating. In the third mode, a phone call may begin in speakerphone mode.

The electronic device 1 of the above-described embodiment allows a user to easily recognize occasions when the speech recognition function can be used. The user can also input voice commands more easily than usual. This increases the convenience of speech recognition.

In another embodiment, the processor 18 may increase the sensitivity of the microphone 11 while causing the electronic device 1 to output information prompting the user for speech input when it is judged that the electronic device 1 satisfies a predetermined condition.

In another embodiment, the processor 18 may temporarily limit the amount of information displayed by the display 13a or limit the number of useable applications when it is judged that the electronic device 1 satisfies a predetermined condition.

In another embodiment, the electronic device 1 may output information prompting the user for speech input when an image displayed on the display is displayed with the transverse direction (left-right direction) of the electronic device 1 in the up-down direction (i.e. landscape mode) and a predetermined application is launched or running.

The electronic device 1 may be a clamshell device. Clamshell devices include feature phones. The processor 18 can judge whether the electronic device 1 is in a closed state or an open state. Here, the processor 18 may cause the electronic device 1 to output information prompting the user for speech input when judging that the electronic device 1 is in the closed state and a predetermined condition is satisfied.

While not discussed in the embodiments, computer program instructions causing a computer to execute the processes performed by the electronic device 1 may be provided. The computer program instructions may be stored on a computer-readable medium. The computer program instructions can be installed on the computer using the computer-readable medium. Here, the computer-readable medium on which the computer program instructions are stored may be a non-transitory recording medium. The non-transitory recording medium is not limited, and examples thereof include recording media such as a CD-ROM or DVD-ROM.

Alternatively, a chip may be provided. The chip is configured by a memory storing computer program instructions for executing the processes performed by the electronic device 1 and a processor for executing the computer program instructions stored on the memory.

The present disclosure has been described based on the drawings and embodiments, but it should be noted that the present disclosure is in no way limited to the drawings or the embodiments. A person of ordinary skill in the art could easily make various changes or modifications based on the present disclosure. Such changes and modifications are therefore included in the scope of the present disclosure. For example, the means, steps, functions included therein, and the like can be reordered in any logically consistent way. Furthermore, means, steps, or functions can be combined into one or divided.

The invention claimed is:

1. An electronic device comprising:
a microphone configured to receive speech input; and
a processor configured to recognize the speech inputted to the microphone;
wherein the processor is configured to judge whether a state of the electronic device is a predetermined state when a voice command is recognized based on the speech inputted to the microphone;
execute a first process corresponding to the voice command when the processor judges that the state of the electronic device is the predetermined state; and
execute a second process corresponding to the voice command when the processor judges that the state of the electronic device is not the predetermined state at a time when the voice command is recognized,
wherein the first process and the second process includes at least one selected from the group consisting of outputting audio, executing a function of the electronic device, changing a setting of the electronic device, performing an internet search, launching an application stored on the electronic device, and executing a function of an application stored on the electronic device, and the first process is a different process than the second process.

2. The electronic device of claim 1,
wherein the voice command comprises a first voice command; and
wherein the processor is configured to execute the second process regardless of the state of the electronic device when the processor judges that the recognized voice command is the first voice command.

3. The electronic device of claim 1, wherein the processor increases sensitivity of the microphone.

4. The electronic device of claim 2,
wherein the voice command further comprises a second voice command; and
wherein the processor is configured to execute the first process when the processor judges that the recognized voice command is the second voice command, even when the processor judges that the state of the electronic device is not the predetermined state.

5. The electronic device of claim 4, wherein the processor is configured to execute the second process when the processor judges that the state of the electronic device is not the predetermined state and that the recognized voice command is not the second voice command.

6. The electronic device of claim 1, wherein the first process comprises a process to cause a display to display an image.

7. The electronic device of claim 6, wherein the first process comprises a process to cause the display to display an image and to cause a speaker not to output audio.

8. The electronic device of claim 6, wherein the processor limits an amount of information displayed by the display.

9. The electronic device of claim 6, wherein the processor limits a number of useable applications.

10. The electronic device of claim 6, wherein the processor causes an output interface to output information prompting the user for speech input when an image displayed on the display is displayed with the transverse direction of the electronic device in the up-down direction and a predetermined application is launched or running.

11. The electronic device of claim 7, wherein the second process comprises a process to cause the speaker to output audio.

12. The electronic device of claim 1, wherein the predetermined state comprises a state of the electronic device being in silent mode.

13. The electronic device of claim 1, further comprising:
a state sensor configured to detect movement of the electronic device;
wherein the processor is configured to judge a moving state of a user carrying the electronic device based on a detection result of the state sensor; and
wherein the predetermined state comprises a state in which the user of the electronic device is walking.

14. The electronic device of claim 2, wherein the first voice command comprises an inquiry about a position of the electronic device.

15. The electronic device of claim 4, wherein the second voice command does not require that the electronic device output text.

16. The electronic device of claim 12, further comprising:
a state sensor configured to detect movement of the electronic device;
wherein the processor is configured to
judge a moving state of a user carrying the electronic device based on the movement detected by the state sensor; and
execute the second process in accordance with the voice command when the processor judges that the moving state of the user satisfies a predetermined condition and the voice command is recognized, even when the processor judges that the electronic device is in silent mode.

17. The electronic device of claim 12, further comprising:
a positioning sensor configured to acquire position information of the electronic device;
wherein the processor is configured to execute the second process in accordance with the voice command when the processor judges that a position of the electronic device satisfies a predetermined condition based on the position information acquired by the positioning sensor and the voice command is recognized, even when the processor judges that the electronic device is in silent mode.

18. The electronic device of claim 1, wherein the predetermined state does not comprise a state of the electronic device related to a setting of an output destination of audio.

19. A control method of an electronic device comprising a microphone configured to receive speech input, the control method comprising:
judging whether a state of the electronic device is a predetermined state when a voice command is recognized based on the speech inputted to the microphone;
executing a first process corresponding to the voice command when it is judged that the state of the electronic device is the predetermined state; and
executing a second process corresponding to the voice command when it is judged that the state of the electronic device is not the predetermined state at a time when the voice command is recognized,
wherein the first process and the second process includes at least one selected from the group consisting of outputting audio, executing a function of the electronic device, changing a setting of the electronic device, performing an internet search, launching an application stored on the electronic device, and executing a function of an application stored on the electronic device, and
the first process is a different process than the second process.

20. A non-transitory computer-readable recording medium storing computer program instructions, which when executed by an electronic device comprising a microphone configured to receive speech input, cause the electronic device to:
judge whether a state of the electronic device is a predetermined state when a voice command is recognized based on the speech inputted to the microphone;
execute a first process corresponding to the voice command when it is judged that the state of the electronic device is the predetermined state; and
execute a second process corresponding to the voice command when it is judged that the state of the electronic device is not the predetermined state at a time when the voice command is recognized,
wherein the first process and the second process includes at least one selected from the group consisting of outputting audio, executing a function of the electronic device, changing a setting of the electronic device, performing an internet search, launching an application stored on the electronic device, and executing a function of an application stored on the electronic device, and
the first process is a different process than the second process.

* * * * *